United States Patent
Hinsley et al.

(10) Patent No.: US 6,377,942 B1
(45) Date of Patent: Apr. 23, 2002

(54) MULTIPLE STRING SEARCH METHOD

(75) Inventors: Stewart Robert Hinsley, Stoke-on-Trent; Léon Richard Le Lohé, Newcastle-Under-Lyme, both of (GB)

(73) Assignee: International Computers Limited, London (GB)

( * ) Notice: Subject to any disclaimer, the term of this patent is extended or adjusted under 35 U.S.C. 154(b) by 0 days.

(21) Appl. No.: 09/358,976

(22) Filed: Jul. 22, 1999

(30) Foreign Application Priority Data

Sep. 4, 1998 (GB) ............................................. 9819183

(51) Int. Cl.[7] ............................................. G06F 17/30
(52) U.S. Cl. .................. 707/1; 707/7; 707/6; 709/315; 711/163; 712/228
(58) Field of Search .......................... 705/10; 707/2–5, 707/1, 6, 7, 10, 200; 709/315; 712/228, 245; 711/163

(56) References Cited

U.S. PATENT DOCUMENTS

| 4,525,780 | A | * | 6/1985 | Bratt et al. ................. 711/163 |
| 4,922,417 | A | * | 5/1990 | Churm et al. ................ 707/1 |
| 4,961,139 | A | * | 10/1990 | Hong et al. .................. 707/1 |
| 4,996,663 | A | * | 2/1991 | Nemes ...................... 707/200 |
| 5,202,985 | A | * | 4/1993 | Goyal ........................ 707/4 |
| 5,281,967 | A | * | 1/1994 | Jung ......................... 341/51 |
| 5,287,499 | A | * | 2/1994 | Nemes ........................ 707/2 |
| 5,926,807 | A | * | 7/1999 | Peltonen et al. .............. 707/3 |
| 6,202,098 | B1 | * | 3/2001 | Chow ........................ 709/315 |
| 6,226,267 | B1 | * | 5/2001 | Spinney et al. ............. 370/235 |

* cited by examiner

*Primary Examiner*—Hosain T. Alam
*Assistant Examiner*—Shahid Alam
(74) *Attorney, Agent, or Firm*—Lee, Mann, Smith, McWilliams, Sweeney & Ohlson

(57) ABSTRACT

A data processing system has a searching mechanism for finding occurrences of a plurality of key strings within a target string. The searching mechanism forms a hash value from each of the key strings, and adds each key string to a collection of key strings having the same hash value. It then selects a plurality of symbol positions in the target string, and forms a hash value at each selected symbol position in the target string. This hash value is used to select one of the collections of key strings. Each key string in the selected collection of key strings is then compared with the target string.

11 Claims, 1 Drawing Sheet

MULTIPLE STRING SEARCH METHOD

BACKGROUND TO THE INVENTION

This invention relates to a method and apparatus for performing multiple string searching.

A string is defined herein as a sequence of symbols from an alphabet. For example, a string may be a text string, formed from a sequence of ASCII characters. As another example, a string may comprise a DNA sequence, based on the four-symbol DNA "alphabet".

The string-search problem is to find the first (or all) occurrences of one or more key strings (or "patterns") within a target string (or "text").

The simplest case is where there is just a single key string. The single string search problem has been widely studied in the Computer Science community. A good survey of this problem is available on the World Wide Web at: http://www.dir.univ-rouen.fr/~charras/string/string.html.

The present invention is concerned with the problem of multiple string searching, that is, of finding occurrences of a plurality of key strings within a target string. The following references relate to the multiple string search problem:

Aho, A. V., and M. Corasick, "Efficient String Matching: An Aid to Bibliographic Search," CACM June 1975, Vol.18, No.6

Commentz-Walter, Beate, "A String Matching Algorithm Fast on the Average," Technical Report, IBM-Germany, Scientific Center Heidelberg, Tiergartenstrasse 15, D-6900 Heidelberg, Germany Haertel, Mike, "kwset.c" (part of the GNU grep command), http://www.gsi.de/gnu/grep-2.0/

The object of the present invention is to provide a novel solution to the multiple string search problem.

SUMMARY OF THE INVENTION

According to the invention a data processing system comprises searching means for finding occurrences of a plurality of key strings within a target string, wherein the searching means comprises:

(a) means for forming a hash value from each of the key strings, and for adding each key string to a collection of key strings having the same hash value;

(b) means for selecting a plurality of symbol positions in the target string;

(c) means for forming a hash value at each selected symbol position in the target string and for using this hash value to select one of the collections of key strings; and (d) means for comparing each key string in the selected collection of key strings with the target string.

DESCRIPTION OF AN EMBODIMENT OF THE INVENTION

One string search method and apparatus in accordance with the invention will now be described by way of example with reference to the accompanying drawings.

Figure 1:
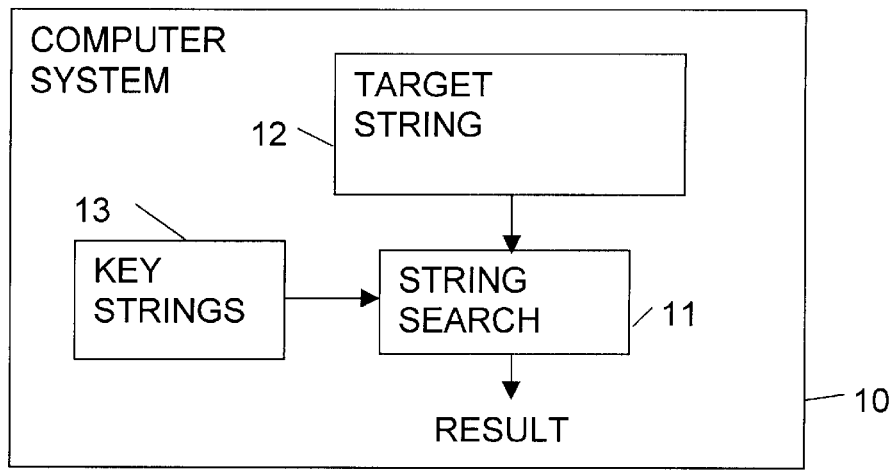
FIG. 1 is a schematic block diagram of a computer system embodying the invention.

FIG. 1 shows a computer system 10, which includes a string search mechanism 11. In this example, the search mechanism is implemented by means of software running on the computer; however, it will be appreciated that, in principle, the search mechanism could alternatively be implemented by means of special-purpose hardware. Apart from the search mechanism, the computer system may be conventional.

As will be described, the string search mechanism 11 receives a target string 12 and a plurality of key strings 13. In this example, the strings 12,13 are character strings, such as for example ASCII characters. The search mechanism searches the target string to find occurrences of the key strings and returns a result indicating which, if any of the key strings were found, and the position of those key strings within the target string.

Figure 2:
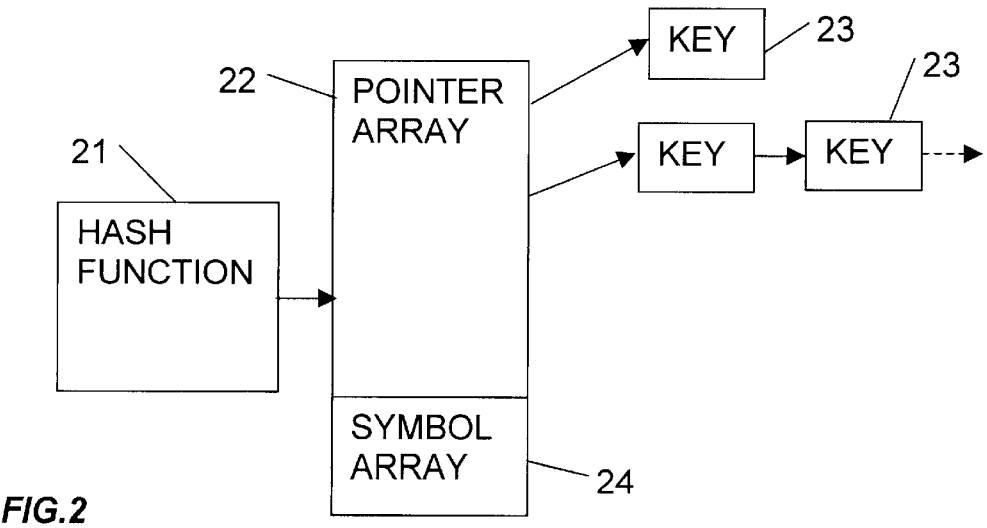
FIG. 2 is a block diagram showing structures used by the string search mechanism.

As shown in FIG. 2, the string search mechanism 11 uses a hash function 21, a pointer array 22, and a number of collections 23 of key strings. In this embodiment, each collection of key strings is represented by a linked list. The pointer array 22 has a range equal to that of the hash function 21. Each pointer in the array points to the first member of the corresponding linked list.

The hash function performs shift and exclusive-or operations on the first two consecutive symbols of an input string, to produce a 14-bit hash value. Single-symbol strings are treated as a special case, using a sub-array 24 of pointers corresponding to the set of individual symbols.

Figure 3:
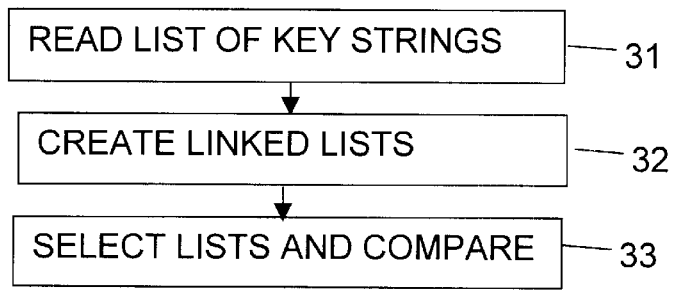
FIG. 3 is a flow chart showing the operation of the string search mechanism.

FIG. 3 shows the operation of the string search mechanism 11.

(Step 31) The string search mechanism first reads the list of key strings into memory.

(Step 32) The string search mechanism then uses the hash function 21 to generate a 14-bit hash value for each of the key strings. The hash value is used to index the pointer array 22, so as to select one of the linked lists 23, and the key string is added to the end of the selected linked list.

(Step 33) The string search mechanism then reads the target string into memory, one line at a time. For each symbol position in the line, the string search mechanism uses the hash function 21 to generate a 14-bit hash value from the first two symbols of the target string at that position. This hash value is used to index the pointer array 22, so as to select one of the linked lists 23. Each key string in the selected linked list is then compared with the target string at that symbol position. If a match is found, a result is returned.

For the special case of single-symbol key, it is necessary only to access the sub-array 24 of pointers corresponding to the set of symbols. If that sub-array has an entry for that symbol, then a match can be returned immediately, without the need for any comparison between the key and the target string.

In summary, it can be seen that the string search mechanism described above uses a two-character hash function to select a subset of the keys for comparison, thereby reducing the number of comparisons required. It can be seen that, given an even distribution of keys, this mechanism gives a 16000 fold reduction in the number of comparisons performed, or nfold, if the number of keys, n, is less that 16000. In practice the keys may not be evenly distributed, and so the actual reduction may be somewhat smaller. Another limitation is that, if the alphabet contains k symbols, then the maximum gain for an even distribution of keys is $k^2$-fold.

Some Possible Modifications

It will be appreciated that many modifications may be made to the system described above without departing from the scope of the present invention. For example, the string search mechanism may be provided with the ability to restrict matches to particular contexts in the target, e.g. comments.

Instead of linked lists as described above, other means may be used for representing the collections of keys. For example, the collections may be represented as ordered linked lists, trees of strings, balanced trees of strings, and trees of characters as used in the algorithms of Aho & Corasick, and Commentz-Walter.

The symbols used to generate the hash value are not necessarily the initial symbols. For example, if the minimum key length m, it may be more efficient to hash on the $(m-1)^{th}$ and $m^{th}$ symbols. Also, it is not essential to use consecutive symbols, and in some situations it may be preferable to use more than two symbols to generate the hash value.

The hashing technique described above may be combined with known "step ahead" optimisations, in which string comparisons are not performed at every symbol position.

What is claimed is:

1. A data processing system comprising searching means for finding occurrences of a plurality of key strings within a target string, wherein the searching means comprises:
   (a) means for forming a hash value from each of the key strings, and for organizing said plurality of key strings into a plurality of collections of key strings, each of said collections of key strings corresponding to a particular hash value;
   (b) means for selecting a plurality of symbol positions in the target string;
   (c) means for forming a hash value at each selected symbol position in the target string and for using this hash value to select one of the collections of key strings; and
   (d) means for comparing each key string in the selected collection of key strings with the target string.

2. A data processing system according to claim 1 wherein each hash value is formed from two symbols of the string.

3. A data processing system according to claim 1 wherein the hash value is formed from the initial symbols of the string.

4. A data processing system according to claim 1 wherein the collections of key strings are linked lists.

5. A data processing system according to claim 1 wherein the selected symbol positions consist of all symbol positions within the target string.

6. A method for finding occurrences of a plurality of key strings within a target string, comprising the steps:
   (a) forming a hash value from each of the key strings, and organizing said plurality of key strings into a plurality of collections of key strings, each of said collections of key strings corresponding to a particular hash value;
   (b) selecting a plurality of symbol positions in the target string;
   (c) forming a hash value at each selected symbol position in the target string and using this hash value to select one of the collections of key strings; and
   (d) comparing each key string in the selected collection of key strings with the target string.

7. A method according to claim 6 wherein each hash value is formed from two symbols of the string.

8. A method according to claim 6 wherein the hash value is formed from the initial symbols of the string.

9. A method according to claim 6 wherein the collections of key strings are linked lists.

10. A method according to claim 6 wherein the selected symbol positions consist of all symbol positions within the target string.

11. An information carrier, holding a program for implementing a method for finding occurrences of a plurality of key strings within a target string, the method comprising the steps:
    (a) forming a hash value from each of the key strings, and organizing said plurality of key strings into a plurality of collections of key strings, each of said collections of key strings corresponding to a particular hash value;
    (b) selecting a plurality of symbol positions in the target string;
    (c) forming a hash value at each selected symbol position in the target string and using this hash value to select one of the collections of key strings; and
    (d) comparing each key string in the selected collection of key strings with the target string.

* * * * *